United States Patent
Sánchez Fernández et al.

(10) Patent No.: US 8,696,340 B2
(45) Date of Patent: Apr. 15, 2014

(54) RE-USABLE RETAINERS FOR CO-BONDING UNCURED STRINGERS

(75) Inventors: Julián Sánchez Fernández, Leganes (ES); Federico López Pérez, Getafe (ES); Yolanda Miguez Charines, Madrid (ES)

(73) Assignee: Airbus Operations, S.L., Getafe (ES)

( * ) Notice: Subject to any disclaimer, the term of this patent is extended or adjusted under 35 U.S.C. 154(b) by 214 days.

(21) Appl. No.: 13/282,924

(22) Filed: Oct. 27, 2011

(65) Prior Publication Data
US 2012/0107435 A1 May 3, 2012

(30) Foreign Application Priority Data

Oct. 28, 2010 (ES) .................................. 201031578

(51) Int. Cl.
*B29C 65/48* (2006.01)
(52) U.S. Cl.
USPC ........... 425/110; 264/275; 425/393; 425/388; 249/135; 249/167
(58) Field of Classification Search
USPC ...................... 264/275; 425/110, 405.1, 504; 249/134–135, 163–167, 139
See application file for complete search history.

(56) References Cited

U.S. PATENT DOCUMENTS

| | | | | | |
|---|---|---|---|---|---|
| 3,283,373 | A | * | 11/1966 | Kiefer et al. | 164/262 |
| 4,836,625 | A | * | 6/1989 | Catta | 312/265.1 |
| 5,709,056 | A | * | 1/1998 | Matsuyama et al. | 52/235 |
| 6,315,929 | B1 | * | 11/2001 | Ishihara et al. | 264/2.5 |
| 2008/0283448 | A1 | * | 11/2008 | Bacho et al. | 209/392 |
| 2011/0076461 | A1 | * | 3/2011 | Jacob et al. | 428/178 |
| 2011/0254267 | A1 | * | 10/2011 | Marengo | 285/405 |
| 2011/0299918 | A1 | * | 12/2011 | Parker | 403/265 |
| 2013/0133171 | A1 | * | 5/2013 | Miguez Charines et al. | 29/428 |
| 2013/0135307 | A1 | * | 5/2013 | Kawasaki et al. | 345/424 |
| 2013/0233973 | A1 | * | 9/2013 | Nordman et al. | 244/131 |
| 2013/0240150 | A1 | * | 9/2013 | Suzuki et al. | 156/433 |

* cited by examiner

*Primary Examiner* — Joseph S Del Sole
*Assistant Examiner* — Nahida Sultana
(74) *Attorney, Agent, or Firm* — Oblon, Spivak, McClelland, Maier & Neustadt, L.L.P.

(57) ABSTRACT

A re-usable retainer designed to be used in the curing process of co-bonding uncured stringers. The re-usable retainer is made of metal so it is not necessary to manufacture one retainer for each manufactured stringer. The metallic retainer is placed in direct contact with the uncured resin so the cured stringer has a very good surface quality.

The re-usable retainer has a special shape that allows a mild transition of the vacuum bag that avoids vacuum bag breakages. The re-usable retainer is easy to install and to remove.

6 Claims, 5 Drawing Sheets

RE-USABLE RETAINERS FOR CO-BONDING UNCURED STRINGERS

OBJECT OF THE INVENTION

It is an object of the present invention to provide a re-usable retainer to be used during the co-bonding of uncured stringers. It is not necessary to manufacture new retainers for each manufactured stringer.

Thus, it is a further object of the invention to provide a re-usable retainer that provides a better surface quality on the cured stringer.

A further object of the invention is to provide a re-usable retainer with a geometry that allows a better adaptation of the vacuum bag to the beginning and the end of the stringer where the metallic retainers should be placed.

A further object of the invention is to provide a re-usable retainer that is easier to install than the retainers known from the prior art.

A further object of the invention is to provide a re-usable retainer that avoids undesired movements during the vacuum bag displacement.

FIELD OF THE INVENTION

The present invention falls within the aeronautical industry. It relates to the retainers used in the manufacturing of "T" shaped composite stringers when those stringers are co-bonded in a cured skin.

BACKGROUND OF THE INVENTION

In aircraft construction, a stringer or longeron or stiffener is a thin strip made of carbon fiber or aluminum or other metallic alloy. Some strips are co-bonded on a cured skin in order to build a part of the aircraft (e.g. wings, HTP, etc).

A very common type of stringers is the one with a "T" shaped cross section defining a stringer web and a stringer foot.

The most common method of manufacturing a composite "T" shaped stringer for an aircraft comprises a first step of hot-forming the laminates in order to achieve semi-stringers geometry with an "L" shaped cross section. A second step is placing two hot-formed semi-stringers together forming a "T" shaped stringer. This "T" shaped stringer is co-bonded on a cured skin with an adhesive line between the stringer and the skin. A third step is a curing cycle, in which curing tools are placed following the contour of the hot-formed "T" shaped stringer inside a vacuum bag during the curing cycle. An invar angle is used as a curing tool in those cases.

The vacuum bag consists of a release film, an airweave and a vacuum bag film. The material of the vacuum bag film is a very thin film with a great elongation capacity to adapt perfectly to the invar geometry, because any corner near 90° can cause a break in the vacuum bag. The milder the geometry of the invar angles and retainers is, the better the behaviour of the vacuum bag film is.

During said curing cycle, the uncured resin of the stringers and the adhesive flow. Retainers are used to prevent the uncured resin and the adhesive from flowing. From the state of the art it is known that retainers have to be used in the upper part of the invar angle in order to prevent the resin from flowing through this upper part. Usually those retainers are silicone retainers placed into slots manufactured in the upper part of the invar angle.

Retainers are also placed in the edges of the invar angles near to the stringer foot in order to prevent the resin and the adhesive from flowing through those edges. These retainers are usually made of silicone and they are placed in slots also manufactured in the invar angles.

The resin and adhesive have to be prevented from flowing in the beginning and the end of the stringer. Nowadays, the materials used for the retainers placed in the beginning and the end of the stringers are cork, airpad, silicone, adhesive tape . . . .

When retainers of cork or airpad are used, they have to be cut into strips in order to have a "T" section with the same dimensions as the stringer cross-section. These retainers made of cork or airpad are placed directly in contact with the uncured stringer. The invar angles used for curing the stringers are placed following its contour, so the retainers that have the same dimensions as the "T" shaped cross section are laterally covered by the invar angle.

One of the disadvantages of these retainers placed at the beginning and at the end of the stringers is the difficulty to remove them. When working with cork retainers the reason of this disadvantage is that during the curing cycle, the uncured resin of the stringers flows between the strips of cork that form the retainer. The adhesive of the cork strips that form the retainer is mixed with the resin flow. After the curing cycle it is necessary to cut the cork. Furthermore, the "T" shaped section of the beginning and the end of the stringer has not a good surface quality.

When using retainers made of airpad during the curing cycle, the retainer loses part of its geometry. When it happens, the retainer and the resin are mixed and the stringer geometry is deformed.

Another disadvantage of the retainers known from the prior art is that they have to be replaced for each manufactured specimen.

It was therefore desirable to find a retainer that can be used in more than one manufactured specimen, provides a better surface quality, is easy to install and remove and allows a better adaptation of the vacuum bag to the beginning and the end of the stringer.

DESCRIPTION OF THE INVENTION

The present invention is designed to overcome above-mentioned drawbacks of the retainers known from the prior art.

The re-usable retainers for co-bonding uncured stringers object of the invention are suitable to prevent the resin and the adhesive from flowing through the beginning and the end of the "T" shaped stringer during the curing cycle. Those re-usable retainers for co-bonding uncured stringers are characterized in that are made of metal. Thus the metal is disposed in direct contact with the uncured resin and the adhesive. Said re-usable retainers have a special geometry that allows a mild transition of the vacuum bag and avoids a break in the vacuum bag. The cross section of the re-usable retainers object of the invention has the same shape than the cross section of the invar alloy angle with the stringer inside. These re-usable retainers have the base part smaller than the base part of the invar alloy angle in order to allow space for the silicone retainers placed in the base of the invar alloy angle near the foot of the stringer.

In another embodiment of the invention, the re-usable retainers for co-bonding uncured stringers object of the invention have an inclined plane in the part that faces the stringer web. This plane has a preferred inclination comprised between 30° and 60°.

In another embodiment of the invention said re-usable retainers have metallic sheets incorporated in order to easily situate the re-usable retainers at the beginning and at the end of the stringer and to avoid undesired movements of said re-usable retainers during the vacuum bag placement.

In another embodiment of the invention, external elements are added to the re-usable retainers to fasten the re-usable retainers to the beginning and to the end of the stringer.

In another embodiment of the invention said external elements added to the re-usable retainers to fasten said re-usable retainers to the beginning and to the end of the stringer are magnets.

The most common method of manufacturing a composite "T" shaped stringer for an aircraft comprises a first step of hot-forming the laminates in order to achieve semi-stringers geometry with an "L" shaped cross section. A second step is placing together two of the hot-formed semi-stringers forming a "T" shaped stringer. This "T" shaped stringer is co-bonded on a cured skin with an adhesive line between the stringer and the skin. A third step is a curing cycle, in which curing tools are placed following the contour of the hot-formed "T" shaped stringer inside a vacuum bag. The re-usable retainers object of the invention are used during the curing cycle in order to prevent the resin and the adhesive from flowing through the beginning and the end of the stringers.

The retainer object of the invention is made of metal and therefore it is re-usable. Consequently, the first advantage of the present invention is that it is not necessary to manufacture a new retainer for each manufactured stringer as it happens with some of the retainers known from the prior art as the ones made of airpad or cork.

The re-usable retainers object of the invention are placed in direct contact with the uncured resin and the adhesive. The surface quality obtained with those re-usable retainers that are made of metal is much better than the surface quality obtained with the conventional retainers.

One of the greatest advantages of the present re-usable retainers is that their geometry allows a better adaptation of the vacuum bag to the beginning and to the end of the stringer. The cause of this mild transition is the incorporation of an inclined plane in the part of the re-usable retainer that faces the web of the stringer. If the inclination of said inclined plane is close to 10°, the transition of the vacuum bag is milder but the re-usable retainer gets too long. If the inclination of said inclined plane is close to 90°, the retainer gets smaller but the transition of the vacuum bag is too abrupt. The range of inclination recommended is between 30° and 60° in order to have a retainer with acceptable dimensions that allows a mild transition of the vacuum bag and avoids a break in the vacuum bag.

In another embodiment of the invention, the re-usable retainers object of the invention are placed directly against the end and the beginning of the uncured stringers. The consequence is that the re-usable retainers object of the invention are easier to install than the retainers known from the prior art.

According to one of the above-described embodiment of the present invention, the re-usable retainer has metallic sheets incorporated in order to easily situate the re-usable retainers in their position. The function of the metallic sheets is to help to avoid undesired movements of the re-usable retainers during the vacuum bag placement.

According to another above-described embodiment of the invention, when it is difficult to get to the beginning and to the end of the stringers due to the cured skin geometry, it is possible to add external elements to fasten the re-usable retainers to the beginning and to the end of the stringer.

According to another above-described embodiment of the invention, the preferred external elements used to fasten the re-usable retainers to the edges of the uncured stringers are preferentially magnets.

BRIEF DESCRIPTION OF THE DRAWINGS

The present invention will be entirely understood on the basis of the following detailed description of the embodiments of the present invention and the accompanying drawings that are presented, solely as an example and which are therefore not restrictive within the present invention, and in which:

FIG. 4 shows a section of the re-usable retainer when it is in an assembled position with the invar alloy angle.

REFERENCES

Figure 1A:
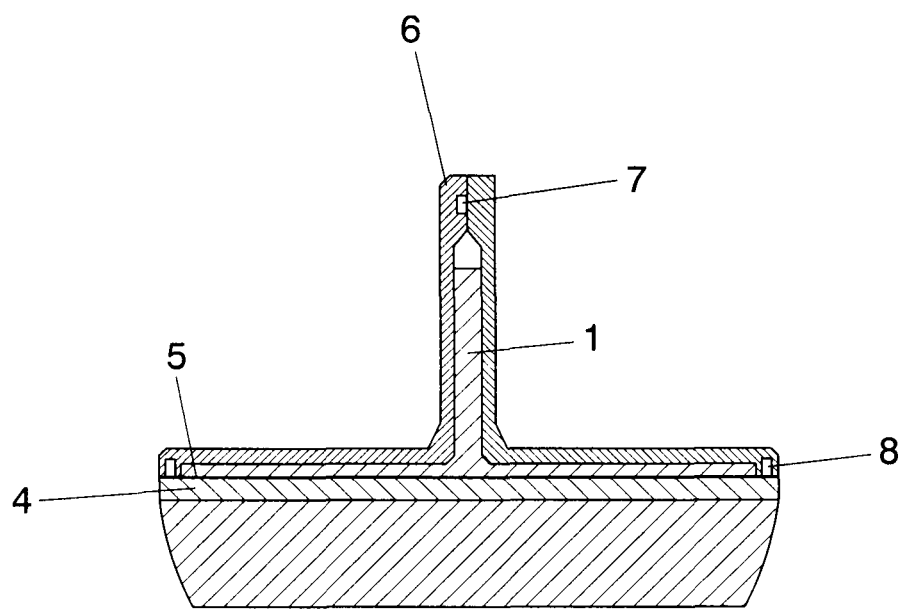
FIG. 1a depicts a "T" shaped stringer that is being cured on a cured skin using an invar alloy angle.

1: uncured stringer
2: stringer web
3: stringer foot
4: cured skin
5: adhesive
6: invar alloy angle
7: silicone retainer of the upper part of the invar angle
8: silicone retainer of the base of the invar alloy angle
9: re-usable retainer
10: inclined plane
11: metallic sheet
12: cured stringer

DESCRIPTION OF A PREFERRED EMBODIMENT

The following description is provided for the benefit of the reader only, and is not intended to limit in any way the invention as set forth by the claims.

FIG. 1a depicts a "T" shaped stringer (1) that is being cured on a cured skin (4) using an invar alloy angle (6) as a curing tool.

The most common method of manufacturing a composite "T" shaped stringer (1) for an aircraft comprises a first step of hot-forming the laminates in order to achieve semi-stringers geometry with an "L" shaped cross section. A second step is placing two of the hot-formed semi-stringers together forming a "T" shaped stringer. This "T" shaped stringer is co-bonded on a cured skin (4) with an adhesive (5) line between the stringer (1) and the cured skin (4). A third step is a curing cycle, in which curing tools are placed following the contour of the hot-formed "T" shaped stringer inside a vacuum bag.

An invar angle (6) is used as a curing tool in those cases. The re-usable retainers (9) object of the invention are used during the curing cycle in order to prevent the resin and the adhesive (5) from flowing through the beginning and the end of the stringers (1).

Figure 1B:
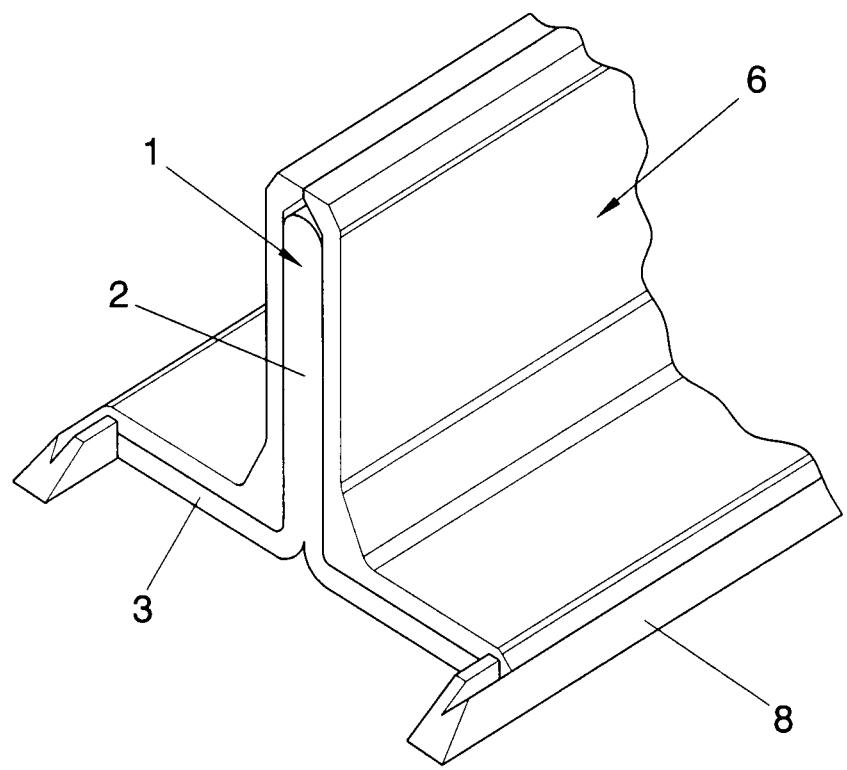
FIG. 1b shows the cross section of an uncured stringer with the invar alloy angle used during the curing cycle covering the uncured stringer.

FIG. 1b shows the cross section of an uncured stringer (1) with the invar alloy angle (6) used during the curing cycle covering the uncured stringer (1).

Figure 2:
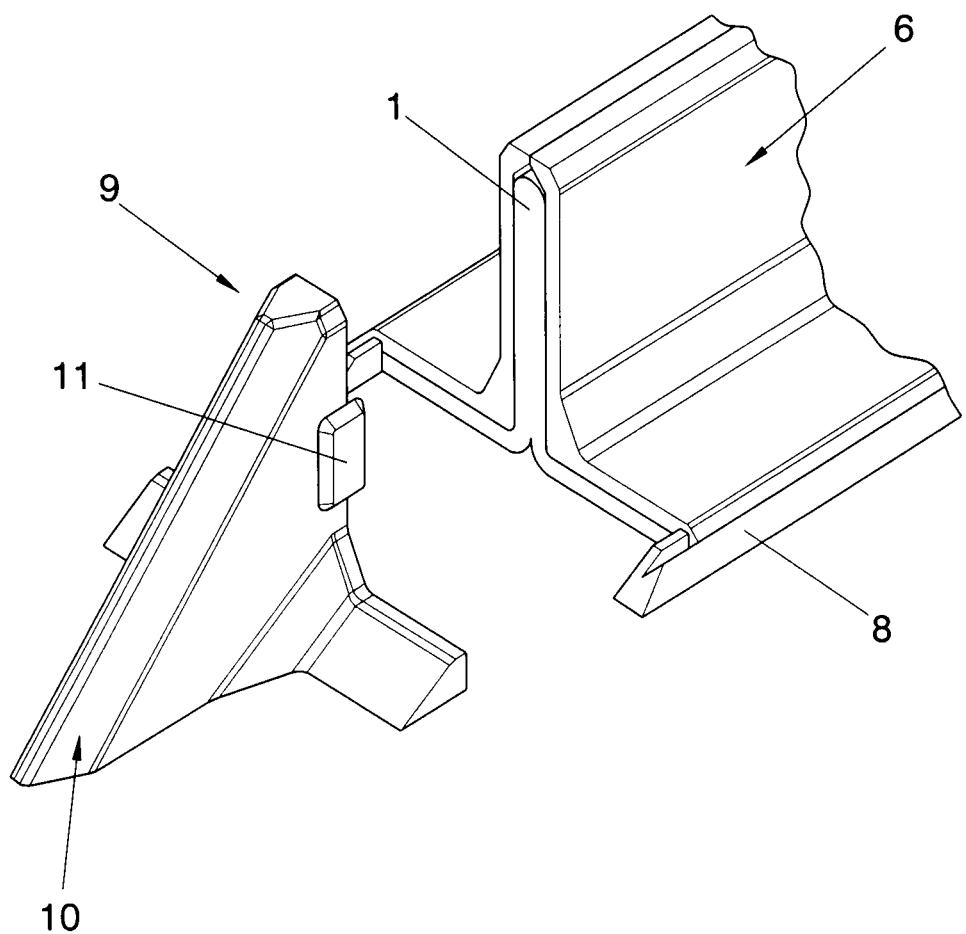
FIG. 2 depicts the cross section of an uncured stringer with the invar alloy angle used during the curing cycle covering the uncured stringer and a re-usable retainer object of the invention.

FIG. 2 depicts the cross section of an uncured stringer (1) with the invar alloy angle (6) used during the curing cycle covering the uncured stringer (1) and a re-usable retainer (9) object of the invention.

The re-usable retainer (9) is suitable for preventing the flow of the resin and the adhesive (5) through the beginning and the end of the "T" shaped stringer (1) during the curing cycle. The re-usable retainer (9) is made of metal. As can be appreciate from FIG. 2, the re-usable retainer has the same cross section shape than the cross section shape of the invar alloy angle (6) with the stringer (1) inside. The re-usable retainer (9) has the base part smaller than the base part of the invar alloy angle (6) in order to allow space for the silicone retainer (8) placed in the foot of the invar angle (6).

As can be seen from FIG. 2, the re-usable retainer (9) has an inclined plane (10) in the part that faces the stringer web (2). Said plane has an inclination comprised preferentially between 30° and 60°.

Figure 3:
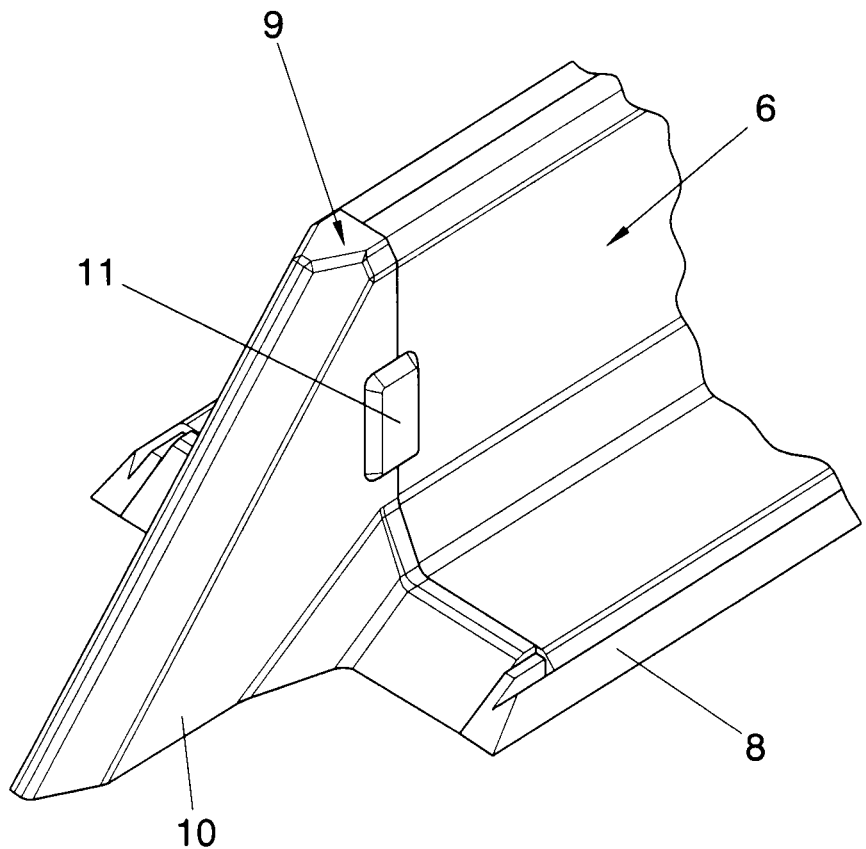
FIG. 3 shows the elements of FIG. 2 in an assembled position.

FIG. 3 shows the elements of FIG. 2 in an assembled position. As can be seen from FIG. 3, the re-usable retainers (9) are placed directly against the beginning and the end of the stringer (1).

In a preferred embodiment of the present invention, the re-usable retainers (9) have metallic sheets (11) incorporated in order to easily situate the re-usable retainers (9) at the beginning and at the end of the stringers (1) and to avoid undesired movements of said re-usable retainers (9) during the vacuum bag placement.

In another embodiment of the present invention, external elements are added to the re-usable retainers (9) to fasten said re-usable retainers to the beginning and to the end of the stringer (1).

In a preferred embodiment of the invention, when external elements are added to the re-usable retainers (9) to fasten the re-usable retainers to the beginning and to the end of the stringer (1), those external elements are magnets.

In another embodiment of the invention, those external elements can be placed anywhere in the re-usable retainers (9). For example, it is possible to place magnets in the metallic sheets (11) used to easily place the re-usable retainer (9) at the beginning and at the end of the stringer (1).

Figure 4A:
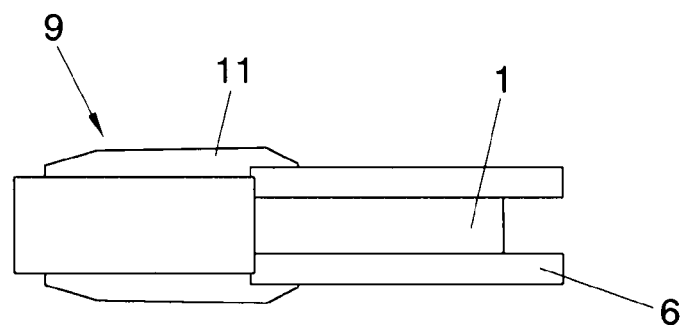
FIG. 4a shows a top view of the re-usable retainer in an assembled position with the invar alloy angle with the uncured stringer.
Figure 4B:
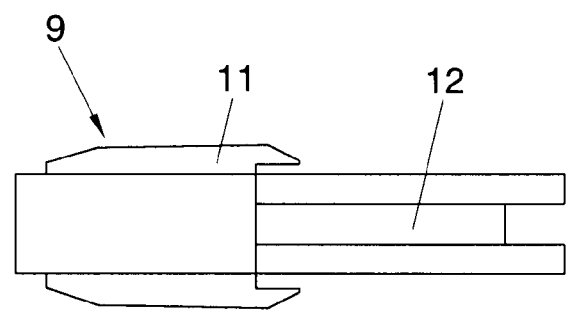
FIG. 4b shows the re-usable retainer in an assembled position with the invar alloy angle with the cured stringer.
Figure 5:
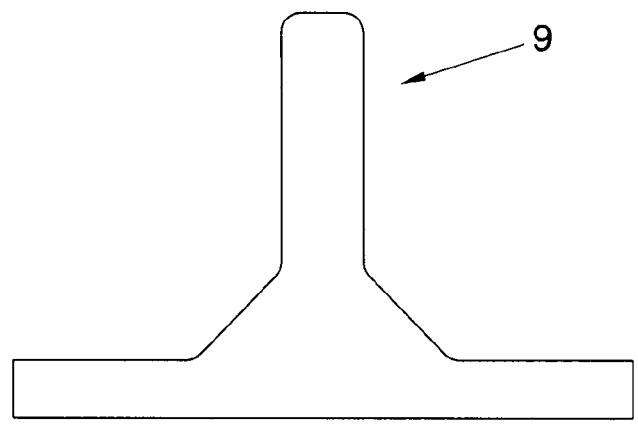
FIG. 5 shows a frontal view of the re-usable retainer. This figure shows the cross section of the re-usable retainer.

FIG. 4 shows a section of the re-usable retainer (9) when it is in an assembled position with the invar alloy angle (6). FIG. 4a shows the re-usable retainer (9) in an assembled position with the invar alloy angle (6) with the uncured stringer (1). FIG. 4b shows the re-usable retainer (9) in an assembled position with the invar alloy angle (6) with the cured stringer (12).

The invention claimed is:

1. A re-usable retainer for co-bonding an uncured stringer, configured to be used in a curing process of a 'T' shaped stringer together with a pair of invar alloy angles that act as curing tools, the re-usable retainer preventing a flow of a resin of an uncured 'T' shaped stringer and an adhesive for co-bonding from flowing through a beginning or an end of the "T" shaped stringer during a curing cycle, the re-usable retainer is made of metal and a cross section of the re-usable retainer includes a base part and a web that is orthogonal to the base part, the re-usable retainer is configured to cover one end of the 'T' shaped stringer that is placed inside the invar alloy angles used as the curing tools for the 'T' shaped stringer, and the re-usable retainer includes a length of the base part being smaller than a sum of lengths of base parts of the invar alloy angles in order to allow space for a silicone retainer to be placed in the base part of each of the invar alloy angles near a foot of the 'T' shaped stringer.

2. The re-usable retainer for co-bonding an uncured stringer, according to claim 1, wherein the re-usable retainer includes an inclined plane in a part that faces a web of the 'T' shaped stringer and said inclined plane includes an inclination between 30° and 60°.

3. The re-usable retainer for co-bonding an uncured stringer, according to claim 1, wherein the re-usable retainer is placed directly against the beginning or the end of the 'T' shaped stringer.

4. The re-usable retainer for co-bonding an uncured stringer, according to claim 1, wherein the re-usable retainer includes metallic sheets incorporated in order to easily situate the re-usable retainer at the beginning or at the end of the 'T' shaped stringer and to avoid undesired movements of said re-usable retainer during a vacuum bag placement.

5. The re-usable retainer for co-bonding an uncured stringer, according to claim 1, wherein external elements are added to the re-usable retainer to fasten said re-usable retainer to the beginning or to the end of the 'T' shaped stringer.

6. The re-usable retainer for co-bonding an uncured stringer, according to claim 5, wherein the external elements added to the re-usable retainer to fasten the re-usable retainer to the beginning or to the end of the 'T' shaped stringer are magnets.

* * * * *